(12) United States Patent
Michael et al.

(10) Patent No.: US 11,352,510 B2
(45) Date of Patent: Jun. 7, 2022

(54) AQUEOUS DISPERSION CONTAINING SILICON DIOXIDE AND TRIMETHYL-1,6-HEXAMETHYLENDIAMINE

(71) Applicant: Evonik Operations GmbH, Essen (DE)

(72) Inventors: Günther Michael, Karlstein (DE); Peter Bauermann, Rodgau (DE); Sascha Herrwerth, Freigericht (DE)

(73) Assignee: Evonik Operations GmbH, Essen (DE)

( * ) Notice: Subject to any disclaimer, the term of this patent is extended or adjusted under 35 U.S.C. 154(b) by 422 days.

(21) Appl. No.: 16/151,967

(22) Filed: Oct. 4, 2018

(65) Prior Publication Data
US 2019/0106581 A1    Apr. 11, 2019

(30) Foreign Application Priority Data
Oct. 6, 2017 (EP) .................................... 17195099

(51) Int. Cl.
| | |
|---|---|
| C09D 7/63 | (2018.01) |
| C09D 7/61 | (2018.01) |
| C09D 7/40 | (2018.01) |
| C09D 7/44 | (2018.01) |
| C09D 5/02 | (2006.01) |
| C09D 7/43 | (2018.01) |
| C08K 5/17 | (2006.01) |
| C08K 3/36 | (2006.01) |

(52) U.S. Cl.
CPC .............. *C09D 7/63* (2018.01); *C09D 5/024* (2013.01); *C09D 7/43* (2018.01); *C09D 7/44* (2018.01); *C09D 7/61* (2018.01); *C09D 7/68* (2018.01); *C08K 3/36* (2013.01); *C08K 5/17* (2013.01)

(58) Field of Classification Search
CPC . C08K 3/36; C08K 5/17; C09D 5/024; C09D 7/43; C09D 7/44; C09D 7/61; C09D 7/63; C09D 7/68
See application file for complete search history.

(56) References Cited

U.S. PATENT DOCUMENTS

| | | | |
|---|---|---|---|
| 5,372,905 A | 12/1994 | Deusser et al. | |
| 5,384,194 A | 1/1995 | Deusser et al. | |
| 5,415,936 A | 5/1995 | Deusser et al. | |
| 5,419,928 A | 5/1995 | Deusser et al. | |
| 5,429,873 A | 7/1995 | Deusser et al. | |
| 5,501,933 A | 3/1996 | Deusser et al. | |
| 5,736,407 A | 4/1998 | Hennig et al. | |
| 5,746,347 A | 5/1998 | Riedemann et al. | |
| 6,436,715 B1 | 8/2002 | Michael et al. | |
| 7,235,298 B2 | 6/2007 | Katusic et al. | |
| 7,282,236 B2 | 10/2007 | Michael et al. | |
| 7,361,777 B2 | 4/2008 | Herrwerth et al. | |
| 7,365,101 B2 | 4/2008 | Kroll et al. | |
| 7,374,743 B2 | 5/2008 | Katusic et al. | |
| 7,438,836 B2 | 10/2008 | Michael et al. | |
| 7,442,666 B2 | 10/2008 | Herrwerth et al. | |
| 7,465,431 B2 | 12/2008 | Katusic et al. | |
| 7,553,465 B2 | 6/2009 | Katusic et al. | |
| 7,598,334 B2 | 10/2009 | Ferenz et al. | |
| 7,605,284 B2 | 10/2009 | Brückner et al. | |
| 7,718,261 B2 | 5/2010 | Katusic et al. | |
| 7,722,714 B2 | 5/2010 | Michael et al. | |
| 7,727,599 B2 | 6/2010 | Döhler et al. | |
| 7,759,402 B2 | 7/2010 | Venzmer et al. | |
| 7,834,122 B2 | 11/2010 | Ferenz et al. | |
| 7,893,128 B2 | 2/2011 | Busch et al. | |
| 7,925,479 B2 | 4/2011 | Zielinski et al. | |
| 7,964,694 B2 | 6/2011 | Ferenz et al. | |
| 8,030,366 B2 | 10/2011 | Ferenz et al. | |
| 8,038,788 B2 | 10/2011 | Michael et al. | |
| 8,084,633 B2 | 12/2011 | Herrwerth et al. | |
| 8,138,372 B2 | 3/2012 | Herrwerth et al. | |
| 8,152,916 B2 | 4/2012 | Meyer et al. | |
| 8,153,098 B2 | 4/2012 | Meyer et al. | |
| 8,163,080 B2 | 4/2012 | Meyer et al. | |
| 8,172,936 B2 | 5/2012 | Herrwerth et al. | |
| 8,211,972 B2 | 7/2012 | Meyer et al. | |
| 8,466,248 B2 | 6/2013 | Meyer et al. | |
| 8,597,789 B2 | 12/2013 | Schulz et al. | |
| 8,617,529 B2 | 12/2013 | Herrwerth et al. | |
| 8,631,787 B2 | 1/2014 | Benitez et al. | |
| 8,642,525 B2 | 2/2014 | Herrwerth et al. | |
| 8,685,376 B2 | 4/2014 | Czech et al. | |
| 8,778,319 B2 | 7/2014 | Herrwerth et al. | |
| 8,841,400 B2 | 9/2014 | Henning et al. | |

(Continued)

FOREIGN PATENT DOCUMENTS

| | | |
|---|---|---|
| CN | 103261335 | 2/2015 |
| CN | 104893242 | 9/2015 |

(Continued)

OTHER PUBLICATIONS

U.S. Pat. No. 5,429,873, Oct. 7, 1992, U.S. Appl. No. 07/957,362, Hans Deusser, et al.

(Continued)

*Primary Examiner* — Shuangyi Abu Ali
(74) *Attorney, Agent, or Firm* — Grüneberg and Meyers PLLC

(57) ABSTRACT

An aqueous dispersion can be used to prepare a lacquer preparation. The aqueous dispersion includes silicon dioxide and at least one of 2,2,4-trimethyl-1,6-hexamethylenediamine and 2,4,4-trimethyl-1,6-hexamethylenediamine.

17 Claims, No Drawings

(56) References Cited

U.S. PATENT DOCUMENTS

| | | | |
|---|---|---|---|
| 8,882,901 B2 | 11/2014 | Michael et al. | |
| 8,993,792 B2 | 3/2015 | Hartung et al. | |
| 9,073,818 B2 | 7/2015 | Herrwerth et al. | |
| 9,138,385 B2 | 9/2015 | Dahl et al. | |
| 9,221,945 B2 | 12/2015 | Alzer et al. | |
| 9,353,289 B2 | 5/2016 | De Gans et al. | |
| 9,616,007 B2 | 4/2017 | Herrwerth et al. | |
| 9,617,390 B2 | 4/2017 | Hinzmann et al. | |
| 9,663,622 B2 | 5/2017 | Hinzmann et al. | |
| 2001/0055639 A1 | 12/2001 | Moritz et al. | |
| 2002/0037936 A1 | 3/2002 | Michael et al. | |
| 2003/0101659 A1 | 6/2003 | Katusic et al. | |
| 2003/0124051 A1 | 7/2003 | Servaty et al. | |
| 2003/0206854 A1 | 11/2003 | Gutsch et al. | |
| 2004/0024070 A1 | 2/2004 | Michael et al. | |
| 2004/0038745 A1 | 2/2004 | Ahlqvist | |
| 2005/0069506 A1 | 3/2005 | Katusic et al. | |
| 2005/0074610 A1 | 4/2005 | Kroll et al. | |
| 2005/0136269 A1 | 6/2005 | Doehler et al. | |
| 2005/0182174 A1 | 8/2005 | Michael et al. | |
| 2006/0003166 A1* | 1/2006 | Wissing | C08G 18/12 428/413 |
| 2006/0041097 A1 | 2/2006 | Herrwerth et al. | |
| 2006/0073092 A1 | 4/2006 | Katusic et al. | |
| 2006/0155089 A1 | 7/2006 | Ferenz et al. | |
| 2006/0210495 A1 | 9/2006 | Meyer et al. | |
| 2007/0003779 A1 | 1/2007 | Katusic et al. | |
| 2007/0048205 A1 | 3/2007 | Katusic et al. | |
| 2007/0059539 A1 | 3/2007 | Doehler et al. | |
| 2007/0100153 A1 | 5/2007 | Brueckner et al. | |
| 2007/0123599 A1 | 5/2007 | Eilbracht et al. | |
| 2007/0172415 A1 | 7/2007 | Zimmermann et al. | |
| 2007/0175362 A1 | 8/2007 | Gutsch et al. | |
| 2007/0190306 A1 | 8/2007 | Herrwerth et al. | |
| 2007/0202030 A1 | 8/2007 | Michael et al. | |
| 2007/0287765 A1 | 12/2007 | Busch et al. | |
| 2007/0299231 A1 | 12/2007 | Doehler et al. | |
| 2008/0027202 A1 | 1/2008 | Ferenz et al. | |
| 2008/0064782 A1 | 3/2008 | Doehler et al. | |
| 2008/0076842 A1 | 3/2008 | Ferenz et al. | |
| 2008/0166289 A1 | 7/2008 | Meyer et al. | |
| 2008/0216708 A1 | 9/2008 | Herrwerth et al. | |
| 2008/0305065 A1 | 12/2008 | Ferenz et al. | |
| 2009/0007483 A1 | 1/2009 | Hansel et al. | |
| 2009/0024374 A1 | 1/2009 | Zielinski et al. | |
| 2009/0054521 A1 | 2/2009 | Herrwerth et al. | |
| 2009/0071467 A1 | 3/2009 | Benitez et al. | |
| 2009/0093598 A1 | 4/2009 | Venzmer et al. | |
| 2009/0120328 A1 | 5/2009 | Michael et al. | |
| 2009/0136672 A1 | 5/2009 | Panz et al. | |
| 2010/0031852 A1 | 2/2010 | Herrwerth et al. | |
| 2010/0034765 A1 | 2/2010 | Herrwerth et al. | |
| 2010/0081763 A1 | 4/2010 | Meyer et al. | |
| 2010/0126387 A1 | 5/2010 | Meyer et al. | |
| 2010/0152350 A1 | 6/2010 | Meyer et al. | |
| 2010/0210445 A1 | 8/2010 | von Rymon Lipinski et al. | |
| 2010/0236451 A1 | 9/2010 | Michael et al. | |
| 2010/0266651 A1 | 10/2010 | Czech et al. | |
| 2010/0276626 A1* | 11/2010 | Seitzer | C09D 7/69 252/62 |
| 2011/0030578 A1 | 2/2011 | Schulz et al. | |
| 2011/0070175 A1 | 3/2011 | Herrwerth et al. | |
| 2011/0091399 A1 | 4/2011 | Meyer et al. | |
| 2011/0206623 A1 | 8/2011 | Wenk et al. | |
| 2012/0015893 A1 | 1/2012 | Herrwerth et al. | |
| 2012/0021960 A1 | 1/2012 | Wenk et al. | |
| 2012/0027704 A1 | 2/2012 | Henning et al. | |
| 2012/0152151 A1 | 6/2012 | Meyer et al. | |
| 2012/0294819 A1 | 11/2012 | Herrwerth et al. | |
| 2013/0071343 A1 | 3/2013 | Herrwerth et al. | |
| 2013/0078208 A1 | 3/2013 | Herrwerth et al. | |
| 2013/0171087 A1 | 7/2013 | Herrwerth et al. | |
| 2013/0204021 A1 | 8/2013 | Hartung et al. | |
| 2013/0259821 A1 | 10/2013 | Henning et al. | |
| 2013/0267403 A1 | 10/2013 | von Rymon Lipinski et al. | |
| 2013/0303673 A1 | 11/2013 | Michael et al. | |
| 2013/0331592 A1 | 12/2013 | Hartung et al. | |
| 2014/0134125 A1 | 5/2014 | Dahl et al. | |
| 2015/0073069 A1 | 3/2015 | De Gans et al. | |
| 2015/0094419 A1 | 4/2015 | Alzer et al. | |
| 2016/0185918 A1 | 6/2016 | Hinzmann et al. | |
| 2016/0222169 A1 | 8/2016 | Hinzmann et al. | |
| 2018/0100071 A1 | 4/2018 | Duerr et al. | |

FOREIGN PATENT DOCUMENTS

| | | |
|---|---|---|
| CN | 105111987 A | 12/2015 |
| CN | 105602310 A | 5/2016 |
| CN | 107099209 A | 8/2017 |
| DE | 25 24 309 | 12/1976 |
| WO | 1991/12204 A1 | 8/1991 |
| WO | 1994/18277 A1 | 8/1994 |
| WO | 2004/020334 | 3/2004 |
| WO | 2009/068379 | 6/2009 |
| WO | 2011/076518 | 6/2011 |
| WO | 2012/062559 | 5/2012 |
| WO | 2016/095196 | 6/2016 |

OTHER PUBLICATIONS

U.S. Pat. No. 5,384,194, Jan. 28, 1993, U.S. Appl. No. 08/012,163, Hans Deusser, et al.

U.S. Pat. No. 5,419,928, Oct. 26, 1993, U.S. Appl. No. 08/141,083, Hans Deusser, et al.

U.S. Pat. No. 5,501,933, May 19, 1994, U.S. Appl. No. 08/245,620, Hans Deusser, et al.

U.S. Pat. No. 5,415,936, Jan. 28, 1993, U.S. Appl. No. 08/012,160, Hans Deusser, et al.

U.S. Pat. No. 5,372,905, Oct. 26, 1993, U.S. Appl. No. 08/141,084, Hans Deusser, et al.

U.S. Pat. No. 5,736,407, Jan. 8, 1997, U.S. Appl. No. 08/780,450, Thomas Hennig, et al.

U.S. Pat. No. 5,746,347, Sep. 3, 1996, U.S. Appl. No. 08/697,857, Thomas Riedemann, et al.

U.S. Pat. No. 6,436,715, Jun. 30, 2000, U.S. Appl. No. 09/607,952, Günther Michael, et al.

U.S. Appl. No. 09/810,517, filed Mar. 19, 2001, 2001-0055639, Tassilo Moritz, Freiberg, et al.

U.S. Appl. No. 09/740,039, filed Dec. 20, 2000, 2002-0037936, Güther Michael, et al.

U.S. Pat. No. 7,282,236, Jul. 18, 2003, 2004-0024070, Günther Michael, et al.

U.S. Appl. No. 11/741,381, filed Apr. 27, 2007, 2007-0202030, Günther Michael, et al.

U.S. Appl. No. 10/417,137, filed Apr. 17, 2003, 2003-0206854, Andreas Gutsch, et al.

U.S. Appl. No. 11/733,998, filed Apr. 11, 2007, 2007-0175362, Andreas Gutsch, et al.

U.S. Appl. No. 10/175,142, filed Jun. 20, 2002, 2003-0124051, Sabine Servaty, et al.

U.S. Pat. No. 7,465,431, Aug. 6, 2002, 2003-101659, Stipan Katusic, et al.

U.S. Pat. No. 7,374,743, Aug. 22, 2005, 2007-0003779, Stipan Katusic, et al.

U.S. Pat. No. 7,718,261, Aug. 24, 2004, 2005-0069506, Stipan Katusic, et al.

U.S. Pat. No. 7,235,298, Feb. 1, 2005, 2006-0073092, Stipan Katusic, et al.

U.S. Appl. No. 10/568,992, filed Feb. 21, 2006, 2006-0210495, Jürgen, Meyer, et al.

U.S. Appl. No. 10/433,837, filed Jun. 9, 2003, 2004-0038745, Stein G. Ahlqvist, et al.

U.S. Pat. No. 7,365,101, Sep. 15, 2004, 2005-0074610, Michael Kroll, et al.

U.S. Appl. No. 11/013,639, filed Dec. 16, 2004, 2005-0136269, Hardi Döhler, et al.

U.S. Pat. No. 7,438,836, Jan. 24, 2005, 2005-1082174, Günther Michael, et al.

(56) References Cited

OTHER PUBLICATIONS

U.S. Pat. No. 8,153,098, Oct. 15, 2007, 2008-0166289, Jürgen, Meyer, et al.
U.S. Pat. No. 7,442,666, Aug. 17, 2005, 2006-0041097-A1, Sascha Herrwerth, et al.
U.S. Appl. No. 11/612,112, filed Dec. 18, 2006, 2007-0172415, Guido Zimmermann, et al.
U.S. Pat. No. 7,553,465, Aug. 11, 2006, 2007-0048205, Stipan Katusic, et al.
U.S. Pat. No. 7,598,334, Jan. 6, 2006, 2006-0155089, Michael Ferenz, et al.
U.S. Appl. No. 11/530,562, filed Sep. 11, 2006, 2007/0059539, Hardi Doehler, et al.
U.S. Pat. No. 7,605,284, Oct. 26, 2006, 2007/00100153, Arndt Brückner, et al.
U.S. Appl. No. 11/593,733, filed Nov. 7, 2006, 2007/0123599, Christian Eilbracht, et al.
U.S. Pat. No. 7,772,714, Oct. 30, 2008, 2009/0120328, Günther Michael, et al.
U.S. Pat. No. 8,163,080, Oct. 27, 2009, 2010/0126387, Jügen Meyer, et al.
U.S. Appl. No. 13/409,715, filed Mar. 1, 2012, 2012/0152151, Jürgen Meyer, et al.
U.S. Pat. No. 7,759,402, Aug. 30, 2007, 2009/0093598, Joachim Venzmer, et al.
U.S. Pat. No. 7,893,128, May 11, 2007, 2007/0287765, Stefan Busch, et al.
U.S. Pat. No. 7,964,694, Jul. 27, 2007, 2008/0305065, Michael Ferenz, et al.
U.S. Pat. No. 8,030,366, Sep. 6, 2007. 2008/0076842, Michael Ferenz, et al.
U.S. Pat. No. 7,834,122, Jul. 27, 2007, 2008/0027202, Michael Ferenz, et al.
U.S. Pat. No. 7,727,599, Sep. 4, 2007, 2008/0064782, Hardi Döhler, et al.
U.S. Pat. No. 7,361,777, Feb. 12, 2007, 2007/0190306, Sascha Herrwerth, et al.
U.S. Pat. No. 8,152,916, Nov. 17, 2009, 2010/0152350, Jürgen Meyer, et al.
U.S. Appl. No. 12/165,735, filed Jul. 1, 2008, 2009/0007483, René Hänsel, et al.
U.S. Pat. No. 8,631,787, Sep. 8, 2008, 2009/071467, Pablo Benitez, et al.
U.S. Pat. No. 8,138,372, Jun. 12, 2008, 2009/0054521, Sascha Herrwerth, et al.
U.S. Pat. No. 7,925,479, Jul. 20, 2007, 2009/0024374, Kurt Zielinski, et al.
U.S. Appl. No. 12/674,831, filed May 9, 2011, 2011/0206623, Hans Henning Wenk, et al.
U.S. Pat. No. 8,038,788, May 5, 2010, 2010/0236451, Güther Michael, et al.
U.S. Pat. No. 8,084,633, Mar. 7, 2008, 2008/0216708, Sascha Herrwerth, et al.
U.S. Appl. No. 12/370,733, filed Feb. 13, 2009, 2010/0210445, Tadeusz von Rymon Lipinski.
U.S. Appl. No. 13/855,273, filed Apr. 2, 2013, 2013/0267403, Tadeusz von Rymon Lipinski.
U.S. Pat. No. 8,617,529, Nov. 15, 2010, 2011/0070175, Sascha Herrwerth, et al.
U.S. Pat. No. 8,466,248, Nov. 5, 2010, 2011/0091399, Jürgen Meyer, et al.
U.S. Appl. No. 12/536,146, filed Aug. 5, 2009, 2010/0034765, Sascha Herrwerth, et al.
U.S. Pat. No. 8,172,936, Aug. 5, 2009, 2010/0031852, Sascha Herrwerth, et al.
U.S. Pat. No. 8,211,972, Sep. 11, 2009, 2010/0081763, Jürgen Meyer, et al.
U.S. Pat. No. 8,642,525, Sep. 22, 2011, 2012/0015893, Sascha Herrwerth, et al.
U.S. Pat. No. 8,685,376, Apr. 16, 2010, 2010/0266651, Karin Czech, et al.
U.S. Appl. No. 13/260,657, filed Sep. 27, 2011, 2012/0021960, Hans Henning Wenk, et al.
U.S. Pat. No. 8,841,400, Oct. 4, 2011, 2012/0027704, Frauke Henning, et al.
U.S. Pat. No. 8,597,789, Aug. 5, 2010, 2011/0030578, Katharina Scchulz, et al.
U.S. Pat. No. 8,778,319, Jul. 17, 2012, 2012/0294819, Sascha Herrwerth, et al.
U.S. Pat. No. 9,073,818, Dec. 3, 2012, 2013/0078208, Sascha Herrwerth, et al.
U.S. Appl. No. 13/701,737, filed Dec. 3, 2012, 2013/0071343, Sascha Herrwerth, et al.
U.S. Pat. No. 8,882,901, Jul. 23, 2013, 2013/0303673, Günther Michael, et al.
U.S. Pat. No. 9,616,007, Mar. 11, 2013, 2013/0171087, Sascha Herrwerth, et al.
U.S. Appl. No. 13/992,311, filed Jun. 7, 2013, 2013/0259821, Frauke Henning, et al.
U.S. Appl. No. 14/001,382, filed Aug. 23, 2013, 2013/0331592, Christian Hartung, et al.
U.S. Pat. No. 9,138,385, Dec. 19, 2013, 2014/0134125, Verena Dahl, et al.
U.S. Pat. No. 8,993,792, Feb. 4, 2013, 2013/0204021, Christian Hartung, et al.
U.S. Pat. No. 9,663,622, Feb. 10, 2016, 2016/0185918, Dirk Hinzmann, et al.
U.S. Pat. No. 9,617,390, Mar. 10, 2016, 2016/0222169, Dirk Hinzmann, et al.
U.S. Pat. No. 9,353,289, Aug. 25, 2014, 2015/0073069, Berend-Jan De Gans, et al.
U.S. Pat. No. 9,221,945, Sep. 24, 2014, 2015/0094419, Heiko Alzer, et al.
Sep. 14, 2017, 2018/0100071, Georg Dürr, et al.
European Search Report issued in EP 17 19 5099, dated Dec. 19, 2017.
Database WPI Week 201776 Thomas Scientific, London, GB; AN 2017-61076W, XP002776361, 3 pages.
Database WPI Week 201662 Thomas Scientific, London, GB; AN 2016-34980T, XP002776362, 2 pages.
Database WPI Week 201662 Thomas Scientific, London, GB; AN 2015-80045U, XP002776363, 2 pages.
Anonymous: "Evonik for composites; Products for efficiency and performance", Apr. 1, 2008 (Apr. 1, 2008), Seiten 1-28, XP055042093, Gefunden im Internet: URL:http://composites.evonik.com/sites/dc/Downloadcenter/Evonik/Product/Composites/Composites_ 16_03_10_Doppel.pdf [gefunden am Oct. 24, 2012) 28 pages.
M. Ettlinger, et al., Archiv der Pharmazie, Jan. 1987, vol. 320, 8 pages.
J. Mathias and G. Wannemacher, Journal of Colloid and Interface Science vol. 125 Sep. 1988, 8 pages.

\* cited by examiner

AQUEOUS DISPERSION CONTAINING SILICON DIOXIDE AND TRIMETHYL-1,6-HEXAMETHYLENDIAMINE

CROSS REFERENCE TO RELATED APPLICATIONS

The present application claims priority to European patent application 17195099.1, filed Oct. 6, 2017, which is incorporated herein by reference.

BACKGROUND OF THE INVENTION

Field of the Invention

The present invention relates to aqueous dispersions containing silicon dioxide and trimethyl-1,6-hexamethylenediamine, to a process for the production thereof and to the use thereof in lacquer preparations.

Discussion of the Background

Silicon dioxide is often used for adjusting rheological properties in liquid systems. Thus, for example, silicon dioxide particles may be used in solvent-based paints and lacquers to prevent running thereof before curing on vertical surfaces or to counter settling of the pigments in such lacquers. Such rheological effects are based on the formation of hydrogen bonds between silanol groups and the adjacent silica particles. Hydrophilic silica has the largest thickening and thixotroping effect in nonpolar liquids, i.e. liquids having a small amount of inherent hydrogen bonds. The inherent hydrogen bonds of a liquid medium can disrupt the formation of hydrogen bonds between silanol groups of the silica and reduce the thickening effect. In moderately polar systems such as a number of epoxy resins, the thickening effect is still quite strong. WO 2009/068379 A1 discloses hydrophilic precipitated silicas exhibiting an elevated thickening effect in nonpolar and moderately polar systems, for example UPE formulations. However, in highly polar systems such as systems containing low molecular weight alcohols or water, hydrophilic silica is often inefficient for thickening and generating thixotropy.

In aqueous systems such as for example emulsions and dispersions, the hydrophilic silicas are usually inefficient when a relatively low concentration of silicon dioxide is employed as a thickener. However, the thickening effect of the silica may be significantly enhanced by using special additives.

It is known that a very wide variety of amines can be adsorbed at the surface of pyrogenic silicon dioxide in aqueous dispersions (Archiv der Pharmazie, 1987, volume 320, pages 1-15). This effect is used for producing highly-filled, ammonia-stabilized aqueous dispersions having a low viscosity. Thus, WO 2012/062559 A1 discloses such aqueous dispersions containing inter alia hydrophobized silicon dioxide particles and amino alcohols having low viscosities at relatively high solids loadings.

WO 2016/095196 discloses aqueous lacquer preparations comprising colloidal silicon dioxide and a very wide variety of amines. On page 23, reference is made to table 4 and it is noted that diamines such as JEFFAMINE D203, isophoronediamine (IPD) and N,N'-diethyl-1,3-propanediamine bring about a greater thickening (viscosity increase) in the aqueous dispersions compared to monoamines. The lacquer preparation of comparative example M here contains for example 7.6% by weight of $SiO_2$ and 0.4% by weight of IPD ($SiO_2$/amine=53.9 mol/mol; $SiO_2$/water=0.04 mol/mol).

SUMMARY OF THE INVENTION

The problem addressed by the present invention is that of providing a water-containing system having a relatively high viscosity compared to the known systems at a relatively low solids content.

This problem, among others, was solved by an aqueous dispersion comprising silicon dioxide and 2,2,4-trimethyl-1,6-hexamethylenediamine and/or 2,4,4-trimethyl-1,6-hexamethylenediamine.

It has now been found that, surprisingly, compared to the other structurally very similar diamines, the abovementioned amines exhibit a much higher viscosity so of the aqueous dispersion at a relatively low content of silicon dioxide.

DETAILED DESCRIPTION OF THE INVENTION

Any ranges mentioned herein below include all values and subvalues between the lowest and highest limit of this range.

One embodiment relates to an aqueous dispersion, comprising: silicon dioxide and at least one of 2,2,4-trimethyl-1,6-hexamethylenediamine and 2,4,4-trimethyl-1,6-hexamethylenediamine The dispersion according to the invention contains silicon dioxide, preferably in amorphous form. This silicon dioxide may include one or more commonly known types of silicas, such as the so-called aerogels, xerogels, perlites, precipitated silicas, fumed silicas. It is preferable when the dispersion according to the invention contains silicon dioxide from the group consisting of pyrogenic silicon dioxide, precipitated silicon dioxide, silicon dioxide produced by a sol-gel process and mixtures thereof.

The silicon dioxide prepared by precipitation (precipitated silica) is formed for example in the reaction of water glass solutions (water-soluble sodium silicates) with mineral acids. It is also possible here to generate in the solution of sodium silicate a colloidal silicon dioxide (silica sol) which provides dispersions having very small particle sizes and very good dispersion stability. A disadvantage, particularly in the polishing of semiconductor substrates, is the proportion of impurities introduced via the sodium silicate starting material.

Pyrogenic silicon dioxide, also known as fumed silica, is produced by means of flame hydrolysis or flame oxidation. This involves oxidizing or hydrolysing hydrolysable or oxidizable starting materials, generally in a hydrogen/oxygen flame. Starting materials that may be used for pyrogenic so methods include organic and inorganic substances. Particularly suitable therefor is silicon tetrachloride. The hydrophilic silica thus obtained is amorphous. Fumed silicas are generally in aggregated form. "Aggregated" shall be understood to mean that so-called primary particles initially formed during genesis form strong bonds with one another in the further course of the reaction to form a three-dimensional network. The primary particles are very substantially free of pores and have free hydroxyl groups on their surface. Pyrogenic silicon dioxide exhibits a very high purity and a primary particle size comparable to colloidal silicon dioxide. However, these primary particles undergo aggregation and agglomeration to form relatively hard particles. Dispersion of the aggregates and agglomerates has proven difficult; the dispersions are less stable and have a propensity for sedimentation or else gelation.

A further silicon dioxide source suitable for producing the dispersions according to the invention is a silicon dioxide produced by a sol-gel process, for example an aerogel, a xerogel or similar materials. Starting materials for an $SiO_2$ sol synthesis are often silicon alkoxides. The hydrolysis of such precursors and the condensation between the thus formed reactive species are the essential fundamental reactions in the sol-gel process. Suitable silicon sources include in particular the tetraalkyl orthosilicates, for example tetramethyl orthosilicate or tetraethyl orthosilicate. Removal of the alcohol formed in the hydrolysis of tetraalkyl orthosilicates is carried out under supercritical conditions (for methanol, temperature >239.4° C.; pressure >80.9 bar) and results in the formation of highly porous $SiO_2$ aerogels.

Compared to the typical precipitated silicas, a pyrogenic silica is more efficient in increasing viscosity, provides a better suspension stability in low-viscosity resins and results in better clarity. The advantages of precipitated silica compared to pyrogenic silica include faster and shear-independent dispersion, lower costs, better flow of the coating or of the glaze, lower porosity in gelcoats. Consequently, a mixture of pyrogenic silica and precipitated silica is used in numerous cases to obtain the advantages of both silica types.

However, it is very particularly preferable when one or more pyrogenic silicas are used in the dispersion according to the invention.

The dispersion according to the present invention may contain from 1% to 50% by weight, particularly preferably from 1% to 30% by weight, of silicon dioxide. The molar ratio of $SiO_2$ to water in the dispersion according to the invention here is preferably from 0.001 to 0.5, particularly preferably from 0.005 to 0.2, very particularly preferably from 0.01 to 0.1.

The silicon dioxide present in the dispersion according to the invention is preferably hydrophilic.

The term "hydrophilic" in the context of the present invention relates to the particles having a relatively high affinity for polar media such as water and having a relatively low hydrophobicity. Such hydrophobicity may typically be achieved by application of appropriate nonpolar groups to the silica surface. The extent of the hydrophobicity of a silica may be determined via parameters including its methanol wettability, as more particularly described in WO2011/076518 A1, pages 5-6, for example. In pure water, a hydrophobic silica separates completely from the water and floats on the surface thereof without being wetted with the solvent. In pure methanol, by contrast, a hydrophobic silica is distributed throughout the solvent volume; complete wetting takes place. Measurement of methanol wettability determines a maximum content of methanol in a methanol/water test mixture at which wetting of the silica still does not take place, i.e. after contact with the test mixture 100% of the employed silica separates from the test mixture. This methanol content in the methanol/water mixture in % by weight is called methanol wettability. The higher such a methanol wettability, the more hydrophobic the silica. The lower the methanol wettability, the lower the hydrophobicity and the higher the hydrophilicity of the material.

The silicon dioxide employed in the dispersion according to the invention has a methanol wettability of less than 20%, preferably from 0% to 15%, particularly preferably from 0% to 10%, very particularly preferably from 0% to 5%, by weight of methanol in a methanol/water mixture.

The silicon dioxide employed in the dispersion according to the invention may have a hydroxyl density of 1.2 to 5.4 $OH/nm^2$, preferably of 1.5 to 3.0 $OH/nm^2$, particularly preferably of 1.8 to 2.5 $OH/nm^2$. The hydroxyl density may be determined by the method published by J. Mathias and G. Wannemacher in Journal of Colloid and Interface Science 125 (1988) by reaction with lithium aluminium hydride. As is explained in the abovementioned publication, the surface of the untreated silicon dioxide powder produced by flame hydrolysis has a hydroxyl density of about 1.8 to 2.5 $OH/nm^2$. WO 2004/020334 A1 for example discloses how silicas having an elevated hydroxyl density of 2.5 to 5.4 $OH/nm^2$ may be obtained. A hydroxyl density lower than 1.8 $OH/nm^2$ may be achieved for example by partial hydrophobizing of the free silanol groups with a suitable hydrophobizing agent. The hydrophobizing agent may be a silicon-containing compound preferably selected from the group consisting of halosilanes, alkoxysilanes, silazanes or siloxanes.

Such a silicon-containing compound is particularly preferably a liquid compound having at least one alkyl group and a boiling point of less than 200° C. It is preferably selected from the group consisting of $CH_3SiCl_3$, $(CH_3)_2SiCl_2$, $(CH_3)_3$ SiCl, $C_2H_5SiCl_3$, $(C_2H_5)_2SiCl_2$, $(C_2H_5)_3SiCl$, $C_3H_8SiCl_3$, $CH_3Si(OCH_3)_3$, $(CH_3)_2Si(OCH_3)_2$, $(CH_3)_3 SiOCH_3$, $C_2H_5Si(OCH_3)_3$, $(C_2H_5)_2Si(OCH_3)_2$, $(C_2H_5)_3 SiOCH_3$, $C_8H_{15}Si(OC_2H_5)_3$, $C_8H_{15}Si(OCH_3)_3$, $(H_3C)_3 SiNHSi(CH_3)_3$ and mixtures thereof. Particular preference is given to $(H_3C)_3 SiNHSi(CH_3)_3$ and $(CH_3)_2SiCl_2$.

The dispersion of the present invention is preferably basic and has a pH of more than 8, preferably of 9 to 13, particularly preferably of 10 to 12.

The dispersion according to the present invention may contain from 0.01% to 10% by weight, particularly preferably from 0.1% to 7% by weight, very particularly preferably from 0.5% to 5% by weight, of 2,2,4-trimethyl-1,6-hexamethylenediamine and/or 2,4,4-trimethyl-1,6-hexamethylenediamine.

In a particularly preferred embodiment of the invention, the dispersion according to the invention contains both 2,2,4-trimethyl-1,6-hexamethylenediamine and 2,4,4-trimethyl-1,6-hexamethylenediamine, wherein the molar ratio of 2,2,4-trimethyl-1,6-hexamethylenediamine to 2,4,4-trimethyl-1,6-hexamethylenediamine is from 0.5 to 1.5, particularly preferably from 0.8 to 1.2, very particularly preferably from 0.9 to 1.1. It is particularly preferable to produce the dispersion according to the invention using an isomer mixture of 2,2,4-trimethyl-1,6-hexamethylenediamine and 2,4, 4-trimethyl-1,6-hexamethylenediamine which has virtually identical proportions of about 50% by weight of both amines and is obtainable for example under the name VESTAMIN® TMD from Evonik Resource Efficiency GmbH.

It has proven particularly advantageous when the molar ratio of silicon dioxide to 2,2,4-trimethyl-1,6-hexamethylenediamine and/or 2,4,4-trimethyl-1,6-hexamethylenediamine in the dispersion according to the invention is from 1 to 1000, particularly preferably from 5 to 200, very particularly preferably from 10 to 100.

It has further proven advantageous when silicon dioxide particles in the dispersion according to the invention have a numerical average particle size $d_{50}$ of not more than 300 nm. A range of 100 to 250 nm is particularly preferred. A numerical average particle size may be determined according to ISO13320:2009 by laser diffraction particle size analysis.

Employable hydrophilic pyrogenic silicon dioxides are hydrophilic pyrogenic silicon dioxides having a BET surface area of 20 to 500 m²/g, preferably of 30 to 400 m²/g. It is particularly preferable to employ hydrophilic pyrogenic silicon dioxides having a BET surface area of 200±25, 300±30 or 380±30 m²/g. The specific surface area, also referred to simply as BET surface area, is determined according to DIN 9277:2014 by nitrogen adsorption in accordance with the Brunauer-Emmett-Teller method.

The silicon dioxide employed in the dispersion according to the invention may have a tamped density of up to 400 g/L, preferably of 20 to 300 g/L, particularly preferably of 30 to 200 g/L, very particularly preferably of 40 to 100 g/L. Tamped densities of various pulverulent or coarse-grain granular materials may be determined according to DIN ISO 787-11:1995 "General methods of test for pigments and extenders—Part 11: Determination of tamped volume and apparent density after tamping". This involves measuring the bulk density of a bulk material after agitation and tamping.

The dispersion according to the invention may contain not only water, silicon dioxide and trimethyl-1,6-hexamethylenediamine but also other constituents, for example solvents and a very wide variety of additives. The proportion of water in the aqueous dispersion according to the invention may be from 50% to 99% by weight, particularly preferably from 60% to 90% by weight.

The dispersion according to the invention may contain up to 10% by weight of at least one organic solvent, with the exception of N-methyl pyrrolidone. The solvent is preferably selected from the group consisting of aliphatic, cycloaliphatic and aromatic hydrocarbons, alcohols, glycols, glycol ethers, ketones, esters and ethers. Explicit mention may be made of n-hexane, n-heptane, cyclohexane, toluene, xylene, ethylbenzene, cumene, styrene, dichloromethane, 1,2-dichlorethane, methanol, ethanol, 1-propanol, 2-propanol, 1-butanol, isobutanol, 2-ethylhexanol, cyclohexanol, diacetone alcohol, acetone, methyl ethyl ketone, methyl isobutyl ketone, diisobutyl ketone, cyclohexanone, mesityl oxide, isophorone, methyl acetate, methyl acetate, butyl acetate, butyl ether, ethyl acetate, butyl acetate, isobutyl acetate, methyl glycol acetate, butyl glycol acetate, ethyl diglycol acetate, butyl diglycol acetate, methoxypropyl acetate, ethoxypropyl acetate, ethylene carbonate, propylene carbonate, diethyl ether, methyl tert-butyl ether, tetrahydrofuran, dioxane, 1-methoxy-2-propanol, 1-ethoxy-2-propanol, 1-isopropoxy-2-propanol, 1-isobutoxy-2-propanol, ethyl glycol, propyl glycol, butyl glycol, ethyl diglycol, butyl diglycol, methyl dipropylene glycol, ethylene glycol, 1,2-propylene glycol, 1,3-butylene glycol, 2,4-pentanediol, 2-methyl-2,4-pentanediol, 2,5-hexanediol, 2,4-heptanediol, 2-ethyl-1,3-hexanediol, diethylene glycol, dipropylene glycol, tripropylene glycol, hexanediol, octanediol and triethylene glycol. Employable with particular preference are diethylene glycol, dipropylene glycol and tripropylene glycol.

The dispersion according to the invention is preferably very largely free from colour pigments and binders employed in the lacquer industry. In a preferred embodiment of the invention, the proportion of silicon dioxide is at least 90% by weight, particularly preferably at least 98% by weight, of the solids content of the dispersion. Very particular preference is given to an embodiment in which the solid phase of the dispersion consists entirely of silicon dioxide.

The dispersion according to the invention may additionally contain up to 1% by weight of N-methyl pyrrolidone.

In a particular embodiment of the invention, from 5% to 20% by weight, preferably from 8% to 15% by weight, in each case based on the proportion of silicon dioxide, of an alcohol alkoxylate of general formula $R^1O((CH_2)_mO)_nH$ are employed in the dispersion according to the invention. The best lacquering results are obtained for one or more compounds of general formula $R^1O((CH_2)_mO)_nH$ where $R^1=CH_3(CH_2)_xCH_2O$ where x=8-18, m=1-4 and n=15-25. Explicit mention may be made of $CH_3(CH_2)_{10}CH_2O[(CH_2)_2O]_{18}H$, $CH_3(CH_2)_{12}CH_2O[(CH_2)_2O]_{18}H$, $CH_3(CH_2)_{14}CH_2O[(CH_2)_2O]_{18}H$, $CH_3(CH_2)_{16}CH_2O[(CH_2)_2O]_{18}H$, $CH_3(CH_2)_{10}CH_2O[(CH_2)_2O]_{20}H$; $CH_3(CH_2)_{12}CH_2O[(CH_2)_2O]_{20}H$, $CH_3(CH_2)_{14}CH_2O[(CH_2)_2O]_{20}H$, $CH_3(CH_2)_{16}CH_2O[(CH_2)_2O]_{20}H$, $CH_3(CH_2)_{10}CH_2O[(CH_2)_2O]_{23}H$, $CH_3(CH_2)_{12}CH_2O[(CH_2)_2O]_{23}H$, $CH_3(CH_2)_{14}CH_2O[(CH_2)_2O]_{23}H$ and $CH_3(CH_2)_{16}CH_2O[(CH_2)_2O]_{23}H$.

The dispersion according to the invention may further contain amines and/or amino alcohols other than trimethyl-1,6-hexamethylenediamine. The proportion thereof is preferably from 3% to 20% by weight, particularly preferably from 5% to 15% by weight, in each case based on the proportion of silicon dioxide. The term amino alcohol is to be understood as meaning a compound containing at least one amino group and at least one hydroxyl group. The molecular weight of the amino alcohol for use in the present invention is preferably from 50 to 500 g/mol, particularly preferably from 100 to 250 g/mol. Suitable amino alcohols are 2-aminoethanol, 1-aminoethanol, 3-amino-1-propanol, 2-amino-1-propanol, 1-amino-2-propanol, 2-amino-2-methyl-1-propanol, 2-amino-2-methyl-1,3-propanediol, 2-amino-2-hydroxymethyl-1,3-propanediol, 2-(2-aminoethoxy)ethanol, 2-amino-1-butanol, 4-amino-1-butanol, 1-amino-2-butanol, 1-amino-3-butanol, 3-amino-1-butanol, 2-amino-1-cyclohexanol, 3-amino-1-cyclohexanol, 4-amino-1-cyclohexanol, 2-amino-1-(hydroxymethyl)cyclopentane, 2-amino-1-hexanol, 6-amino-1-hexanol, 2-amino-3-methyl-1-butanol, 1-(aminomethyl)cyclohexanol, 6-amino-2-methyl-2-heptanol, 2-amino-3-methyl-1-pentanol, 2-amino-4-methyl-1-pentanol, 2-amino-1-pentanol, 5-amino-1-pentanol, 1-amino-2,3-propanediol, 2-amino-1,3-propanediol, 2-amino-1,3-propanediol, 2-((3-aminopropyl)methylamino)ethanol or mixtures thereof.

Amino alcohols of the type $(CH_3)_2NCHR_1CHR_2$—O—$[CHR_3$—$CHR_4$—$O]_nH$, in which $R_1$, $R_2$, $R_3$ and $R_4$ may each represent H, $CH_3$ or $C_2H_5$ and n may be 1-5, wherein $R_1$, $R_2$, $R_3$ and $R_4$ may each be identical or different, may also be a constituent of the dispersion according to the invention. Examples include 1-(2-dimethylaminoethoxy)2-propanol, 1-(1-dimethylamino-2-propoxy)-2-propanol, 2-(1-dimethylamino-2-propoxy)ethanol, 2-(2-dimethylaminoethoxy)ethanol and 2-[2-(2-dimethylaminoethoxy)ethoxy]ethanol.

N,N-dialkylalkanolamines such as N,N-dimethylethanolamine and N,N-dimethylisopropanolamine are particularly preferred.

The dispersion according to the invention may further contain from 0.1% to 1.5% by weight of at least one polyethylene glycol and/or polypropylene glycol. Preference is given to polypropylene glycols having an average molecular weight (mass-average) of 100 g/mol or more, particularly preferably of 150 to 6000 g/mol. It has proven advantageous when the dispersion according to the invention further contains from 0.1% to 1% by weight, based on the proportion of silicon dioxide, of at least one copolymer of general formula I

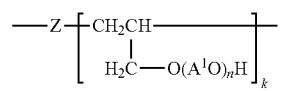

I where Z=

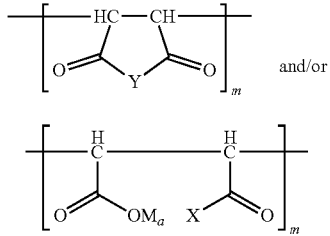

where
M is hydrogen, monovalent or divalent metal cation, ammonium ion, organic amine radical,
a is 1, or in the case where M is a divalent metal cation, a=0.5,
X is likewise —$OM_a$ or —$O$—$(C_pH_{2p}O)_q$—$R^1$ where
 $R^1$ is H, aliphatic hydrocarbon radical having 1 to 20 carbon atoms, cycloaliphatic hydrocarbon radical having 5 to 8 carbon atoms, optionally substituted alkyl radical having 6 to 14 carbon atoms, p=2-4, q=0-100, —$NHR^2$ and/or —$NR^2_2$ where $R^2$=$R^1$ or —$CO$—$NH_2$
Y is O, $NR^2$,
$A^1$ is ethylene radical, propylene radical, isopropylene radical, butylene radical,
m is 10-30,
n is 0-50,
k is 10-30, wherein the sum of
 m+k is in the range of 20-60, preferably of 20-40.
—$(A^1O)_n$— may be either a homopolymer of one of the recited alkylene oxides or a block copolymer or copolymer having a random distribution of two or more of the monomers in the polymer molecule. The units [ ]$_m$ and [ ]$_k$ may likewise be in the form of block copolymers or copolymers having a random distribution of two or more of the monomers in the polymer molecule.

Preferably used as monovalent or divalent metal cation M are sodium, potassium, calcium and magnesium ions. Preferably employed as organic amine radicals are substituted ammonium groups derived from primary, secondary or tertiary $C_1$- to $C_{20}$-alkylamines, $C_1$- to $C_{20}$-alkanolamines, $C_6$- to $C_8$-cycloalkylamines and $C_6$- to $C_{14}$-arylamines. Examples of corresponding amines are methylamine, dimethylamine, trimethylamine, ethanolamine, diethanolamine, triethanolamine, cyclohexylamine, dicyclohexylamine, phenylamine, diphenylamine in the protonated (ammonium) form.

X may represent —$OM_a$ or —$O$—$(C_pH_{2p}O)_q$—$R^1$ where $R^1$=H, an aliphatic hydrocarbon radical having 1 to 20 carbon atoms, a cycloaliphatic hydrocarbon radical having 5 to 8 carbon atoms, an aryl radical having 6 to 14 carbon atoms, which may optionally also be substituted. p may be from 2 to 4, q=0 to 100, wherein in a preferred embodiment p=2 or 3 and thus derives from polyethylene oxide or polypropylene oxide. Alternatively, X may also represent —$NHR^2$ and/or —$NR^2_2$ where $R^2$=$R^1$ or —$CO$—$NH_2$, which corresponds to the monosubstituted or disubstituted monoamides of the corresponding unsaturated carboxylic acid. Y may represent O (acid anhydride) or $NR^2$ (acid imide).

Employable with preference is a copolymer of general formula Ia or Ib, wherein $A^1$ is an ethylene radical, m is 10 bis 30, n is 5 to 20, k is 10 to 30 and wherein the sum of m+k is in the range from 20 to 40.

Also employable with preference are compounds of general formula Ia or Ib in which R represents an optionally branched, optionally multiply bonded, optionally hydroxyl-containing alkyl radical having 8 to 18 carbon atoms, A represents an ethylene radical, M=H or an alkali metal, a is 1 to 30, b is 1 or 2.

A dispersion which has proven particularly suitable for lacquering applications contains at least one alcohol alkoxylate of general formula $R^1O((CH_2)_mO)_nH$, at least one polypropylene glycol having an average molecular weight of 100 to 6000 g/mol and at least one copolymer of general formula I. The alcohol alkoxylate/polypropylene glycol/copolymer weight ratios here are preferably 50-70/15-30/10-20, where these sum to 100.

The dispersion according to the invention may finally also have defoaming agents and preservatives added to it. The proportion thereof in the dispersion is generally below 1% by weight.

The invention further provides a lacquer preparation containing the dispersion according to the invention.

Suitable binders here may be the resins customary in lacquer and coating technology, such as are described for example in "Lackharze, Chemie, Eigenschaften and Anwendungen, Editors D. Stoye, W. Freitag, Hanser Verlag, Munich, Vienna 1996".

Examples include inter alia polymers and copolymers of (meth)acrylic acid and their esters, optionally bearing further functional groups, with further unsaturated compounds, such as for example styrene, polyether polyols, polyester polyols, polycarbonate polyols, polyurethane polyols and epoxy resins and also any desired mixtures of these polymers, and also fatty-acid-modified alkyd resins produced by polycondensation.

Also employable as polymer components are organic hydroxyl-bearing compounds, for example polyacrylate, polyester, polycaprolactone, polyether, polycarbonate and polyurethane polyols and hydroxy-functional epoxy resins and also any desired mixtures of these polymers. Employed in particular are aqueous or solvent-containing or solvent-free polyacrylate and polyester polyols and any desired mixtures thereof.

Polyacrylate polyols are copolymers of hydroxyl-containing monomers with other olefinically unsaturated monomers, for example esters of (meth)acrylic acid, styrene, alpha-methylstyrene, vinyltoluene, vinylesters, maleic and fumaric monoalkyl and dialkyl esters, alpha-olefins and other unsaturated oligomers and polymers.

The lacquer preparation according to the invention may further contain colour pigments and/or inactive fillers.

The colour pigments may be organic or inorganic in nature. Examples include lead oxides, lead silicates, iron oxides, phthalocyanine complexes, titanium dioxides, zinc oxides, zinc sulfide, bismuth vanadate, spinel mixed oxides, for example titanium-chromium, titanium-nickel or tin-zinc spinel or mixed oxides, platelet-shaped metallic or interference pigments and carbon blacks.

The lacquer preparation according to the invention may further contain inactive fillers. "Inactive fillers" shall be understood to mean fillers known to those skilled in the art which have only an insignificant effect, if any, on the rheological properties of the preparation. Examples include calcium carbonate, diatomaceous earth, mica, kaolin, chalk, quartz and talc.

Color pigments and/or inactive fillers are typically present in proportions which sum to 10% to 70% by weight, preferably from 30% to 50% by weight, based on the total solids content of the preparation.

The total solids content of the lacquer preparation which is composed of silicon dioxide particles, binders and optionally colour pigments and inactive fillers is preferably from 10% to 80% by weight, particularly preferably from 20% to 70% by weight, very particularly preferably from 30% to 60% by weight, based on the total mass of the lacquer preparation.

The invention further provides for the use of the dispersion according to the invention as an additive to hydrofillers in the automotive industry, as a coating constituent in can- and coil-coating processes and as an additive in water-based UV-curable formulations.

The invention further provides a process for producing the dispersion according to the invention by stirring the mixture comprising silicon dioxide, water and 2,2,4-trimethyl-1,6-hexamethylenediamine and/or 2,4,4-trimethyl-1,6-hexamethylenediamine.

The process according to the invention may be performed in a dispersing apparatus for example. Apparatuses suitable as such a dispersing apparatus for producing the dispersion according to the invention include all apparatuses capable of bringing about intensive wetting of the pulverulent or granular silicon dioxide with the aqueous phase. The lacquer industry typically uses so-called dissolvers for this purpose, the relatively simple construction of which allows for a low-maintenance and easy-clean mode of production. However, depending on the required viscosity or else fill level of the aqueous dispersion to be generated, intensive dispersing or post-milling is still necessary. Post-milling may be carried out in an agitator bead mill for example. However, intensive shearing using rotor/stator machines is often sufficient. An expedient combination of wetting and dispersing facility is provided by the rotor/stator machines from Ystral which allow the powder to be aspirated and, after closing the powder aspiration opening, dispersed by intensive shearing.

The process of the present invention is preferably performed at a stirrer speed of more than 500 rpm (revolutions per minute), particularly preferably of 1000 to 10000 rpm, very particularly preferably of 2000 to 8000 rpm.

Especially when using rotor/stator machines where aspiration of air and thus foam formation can occur, it has proven advantageous to initially charge only a portion of the required water and the additives and to incorporate a portion of the silicon dioxide. Above a particular amount of silicon dioxide of about 25-30% by weight, based on the entirety of the silicon dioxide to be incorporated, the defoaming effect thereof is apparent. Only after addition of the entire amount of powder are the remaining proportions of water subsequently added. This reserves a sufficient volume in the make-up vessel for the initial foam formation at commencement of the powder addition.

Having generally described this invention, a further understanding can be obtained by reference to certain specific examples which are provided herein for purposes of illustration only and are not intended to be limiting unless otherwise specified.

EXAMPLES

Comparative Examples 1-4 and Examples 1-3

Production of all dispersions from comparative examples 1-4 and inventive examples 1-3 was carried out by initially incorporating the silicon dioxide into the water by stirring with a dissolver (ATP DISPERMILL Vango 100) at 4000 rpm over 30 min to obtain a 25% SiO2 dispersion. This 25% aqueous $SiO_2$ dispersion was mixed with water and amine according to the desired end composition and subjected to further dispersion with a Polytron PT 6100 rotor-stator disperser from Kinematica AG at 6000 rpm for 30 min.

The dynamic viscosity (shear viscosity) of the obtained dispersions was determined using a rheometer (Anton Paar MCR100) at a rotational speed of $sec^{-1}$ (1 revolution per second).

The employed amounts and proportions of $SiO_2$ and respective amines, the pH of the resulting dispersions and the viscosity thereof are summarized in table 1 which follows:

TABLE 1

| Example | Comp. Ex. 1 | Comp. Ex. 2 | Comp. Ex. 3 | Comp. Ex. 4 | 1 | 2 | 3 |
|---|---|---|---|---|---|---|---|
| Amine | DMAE[1] | HMDA[2] | IPD[3] | IPD[3] | TMD[4] | TMD[4] | TMD[4] |
| % by weight of amine | 1 | 0.63 | 0.95 | 0.95 | 0.9 | 0.9 | 3.55 |
| % by weight of $SiO_2$[5] | 10 | 10 | 10 | 20 | 10 | 20 | 20 |
| $SiO_2$[5]/amine[6] [mol/mol] | 14.9 | 30.8 | 29.9 | 59.8 | 29.3 | 58.6 | 14.9 |
| pH | 10.6 | 11.4 | 10.8 | 11.2 | 11.0 | 11.3 | 11.4 |
| Viscosity at $sec^{-1}$ [mPa * s] | 3 | 22 | 3 | 4 | 1600 | 17500 | Solid[7] |

[1]DMAE = N,N-dimethylaminoethanol [CAS No 108-01-0, Mw = 89.1 g/mol]
[2]HMDA = 1,6-hexamethylenediamine [CAS No 124-09-4, Mw = 116.2 g/mol]
[3]IPD = isophoronediamine [CAS No 2855-13-2, Mw = 170.3 g/mol]
[4]TMD = isomer mixture of approximately equal parts (50% by weight/50% by weight) of 2,2,4-trimethyl-1,6-hexamethylenediamine and 2,4,4-trimethyl-1,6-hexamethylenediamine [Mw = 158.3 g/mol] obtainable from Evonik Resource Efficiency GmbH under the name VESTAMIN ® TMD.
[5]$SiO_2$ = pyrogenic silicon dioxide AEROSIL ® 200 (BET = 200 $m^2$/g) from Evonik Resource Efficiency GmbH.
[6]The term "amine" relates to the amines employed in each case (DMAE, HMDA, IPD and TMD).
[7]Viscosity of the mixture cannot be measured because it solidifies.

Inventive examples 1-3 clearly show that, utterly surprisingly, TMD exhibits a much greater thickening effect than the structurally very similar 1,6-hexamethylenediamine (comparative example 2) and isophoronediamine (comparative examples 3 and 4) given otherwise identical other constituents of the dispersions and identical test conditions.

Numerous modifications and variations on the present invention are possible in light of the above teachings. It is therefore to be understood that within the scope of the appended claims, the invention may be practiced otherwise than as specifically described herein.

We claim:

1. An aqueous dispersion, comprising: from 1% to 30% by weight of silicon dioxide and at least one member selected from the group consisting of 2,2,4-trimethyl-1,6-hexamethylenediamine and 2,4,4-trimethyl-1,6-hexamethylenediamine,
    wherein the aqueous dispersion has a pH of 10 to 12,
    wherein the silicon dioxide is a pyrogenic silicon dioxide, and
    wherein the silicon dioxide has a tamped density of up to 400 g/L, determined according to DIN ISO 787-11:1995.

2. The aqueous dispersion according to claim 1, comprising from 0.01% to 10% by weight of 2,2,4-trimethyl-1,6-hexamethylenediamine, 2,4,4-trimethyl-1,6-hexamethylenediamine, or a combination thereof.

3. The aqueous dispersion according to claim 1, wherein the silicon dioxide is in the form of particles having a numerical average particle size $d_{50}$ of not more than 300 nm.

4. The aqueous dispersion according to claim 1, wherein a molar ratio of silicon dioxide to 2,2,4-trimethyl-1,6-hexamethylenediamine, 2,4,4-trimethyl-1,6-hexamethylenediamine, or the combination thereof, in the dispersion is from 5 to 100.

5. The aqueous dispersion according to claim 1, wherein a molar ratio of silicon dioxide to water in the dispersion is from 0.003 to 0.5.

6. The aqueous dispersion according to claim 1, wherein the silicon dioxide has a methanol wettability of less than 20% by weight of methanol in a methanol/water mixture.

7. The aqueous dispersion according to claim 1, wherein the silicon dioxide has a hydroxyl density of 1.2 to 5.4 $OH/nm^2$.

8. The aqueous dispersion according to claim 3, wherein the silicon dioxide particles have a BET surface area of 20 to 500 $m^2/g$.

9. The aqueous dispersion according to claim 1, which comprises 2,2,4-trimethyl-1,6-hexamethylenediamine and 2,4,4-trimethyl-1,6-hexamethylenediamine, wherein a molar ratio of 2,2,4-trimethyl-1,6-hexamethylenediamine to 2,4,4-trimethyl-1,6-hexamethylenediamine is from 0.8 to 1.2.

10. A process for producing the dispersion according to claim 1, the process comprising: stirring the mixture comprising silicon dioxide, water and at least one member selected from the group consisting of 2,2,4-trimethyl-1,6-hexamethylenediamine and 2,4,4-trimethyl-1,6-hexamethylenediamine.

11. A process for adjusting a rheological property of a composition, the process comprising: adding the aqueous dispersion according to claim 1 to the composition, wherein the composition is selected from the group consisting of an automotive hydrofiller, a coating composition, a water-based UV curable formulation, and a clear lacquer.

12. An additive to hydrofillers, comprising: the aqueous dispersion according to claim 1.

13. The aqueous dispersion according to claim 1, comprising from 0.5% to 5% by weight of 2,2,4-trimethyl-1,6-hexamethylenediamine, 2,4,4-trimethyl-1,6-hexamethylenediamine, or a combination thereof and 50% to 98.5% by weight water.

14. The aqueous dispersion according to claim 1, wherein weight proportion of the silicon dioxide is at least 90% by weight based on solids content of the aqueous dispersion.

15. The aqueous dispersion according to claim 1, comprising 5 to 30% by weight of the silicon dioxide.

16. The aqueous dispersion according to claim 1, comprising 10 to 30% by weight of the silicon dioxide.

17. The aqueous dispersion according to claim 1, wherein the silicon dioxide has a tamped density of 40 to 100 g/L, determined according to DIN ISO 787-11:1995.

* * * * *